US011308510B2

United States Patent
Baron et al.

(10) Patent No.: US 11,308,510 B2
(45) Date of Patent: Apr. 19, 2022

(54) METHODS AND APPARATUS TO COLLECT AND ANALYZE RATING INFORMATION

(71) Applicant: Intel Corporation, Santa Clara, CA (US)

(72) Inventors: Casey Baron, Chandler, AZ (US); Annie Foong, Aloha, OR (US); Sherry Chang, El Dorado Hills, CA (US); Hebatallah Saadeldeen, San Jose, CA (US); Karla Saur, Portland, OR (US)

( * ) Notice: Subject to any disclaimer, the term of this patent is extended or adjusted under 35 U.S.C. 154(b) by 388 days.

(21) Appl. No.: 16/147,133

(22) Filed: Sep. 28, 2018

(65) Prior Publication Data
US 2019/0172081 A1    Jun. 6, 2019

(51) Int. Cl.
*G06Q 30/02* (2012.01)
*G06Q 20/10* (2012.01)

(52) U.S. Cl.
CPC ..... *G06Q 30/0204* (2013.01); *G06Q 30/0282* (2013.01); *G06Q 20/10* (2013.01)

(58) Field of Classification Search
CPC ............. G06Q 30/0282; G06Q 20/102; G06Q 30/0204
See application file for complete search history.

(56) References Cited

U.S. PATENT DOCUMENTS

| | | | |
|---|---|---|---|
| 2015/0371191 A1* | 12/2015 | Taylor ................ | G06K 9/00422 705/321 |
| 2016/0356615 A1* | 12/2016 | Arata ..................... | G06Q 50/30 |
| 2020/0042925 A1* | 2/2020 | Ramani .................. | G06F 9/542 |

OTHER PUBLICATIONS

Designing Against Discrimination in Online Markets; Levy et al.; 2017 (Year: 2017).*
Discriminating Tastes: Customer Ratings as Vehicles for Bias; Levy et al.; Oct. 2016 (Year: 2016).*
Discrimination, Regulation, and Design in Ridehailing; Scott Middleton; 2010 (Year: 2010).*

* cited by examiner

*Primary Examiner* — Deirdre D Hatcher
(74) *Attorney, Agent, or Firm* — Hanley, Flight & Zimmerman, LLC

(57) ABSTRACT

Methods, apparatus, systems and articles of manufacture are disclosed to collect and analyze driver rating information. An example apparatus includes at least one of an audio input device or a video input device to collect at least one of audio or video; a rating input device to receive a rating associated with a person; a first rating analyzer to analyze the at least one of the audio or the video to determine demographic information for the person; and a second rating analyzer to: analyze the demographic information, the rating, and historical rating information to detect a demographic trend in the rating information; and output an indication of the trend.

22 Claims, 8 Drawing Sheets

METHODS AND APPARATUS TO COLLECT AND ANALYZE RATING INFORMATION

FIELD OF THE DISCLOSURE

This disclosure relates generally to analyzing rating information, and, more particularly, to methods and apparatus to collect and analyze rating information.

BACKGROUND

In recent years, the increased use of computing devices and the Internet has led to an increased use in systems and services that facilitate the sharing of rating information about products and services. For example, the increased use of ride sharing services has led to an increase in the collection and sharing of rating information about the drivers and passengers of such services.

DETAILED DESCRIPTION

Figure 1:
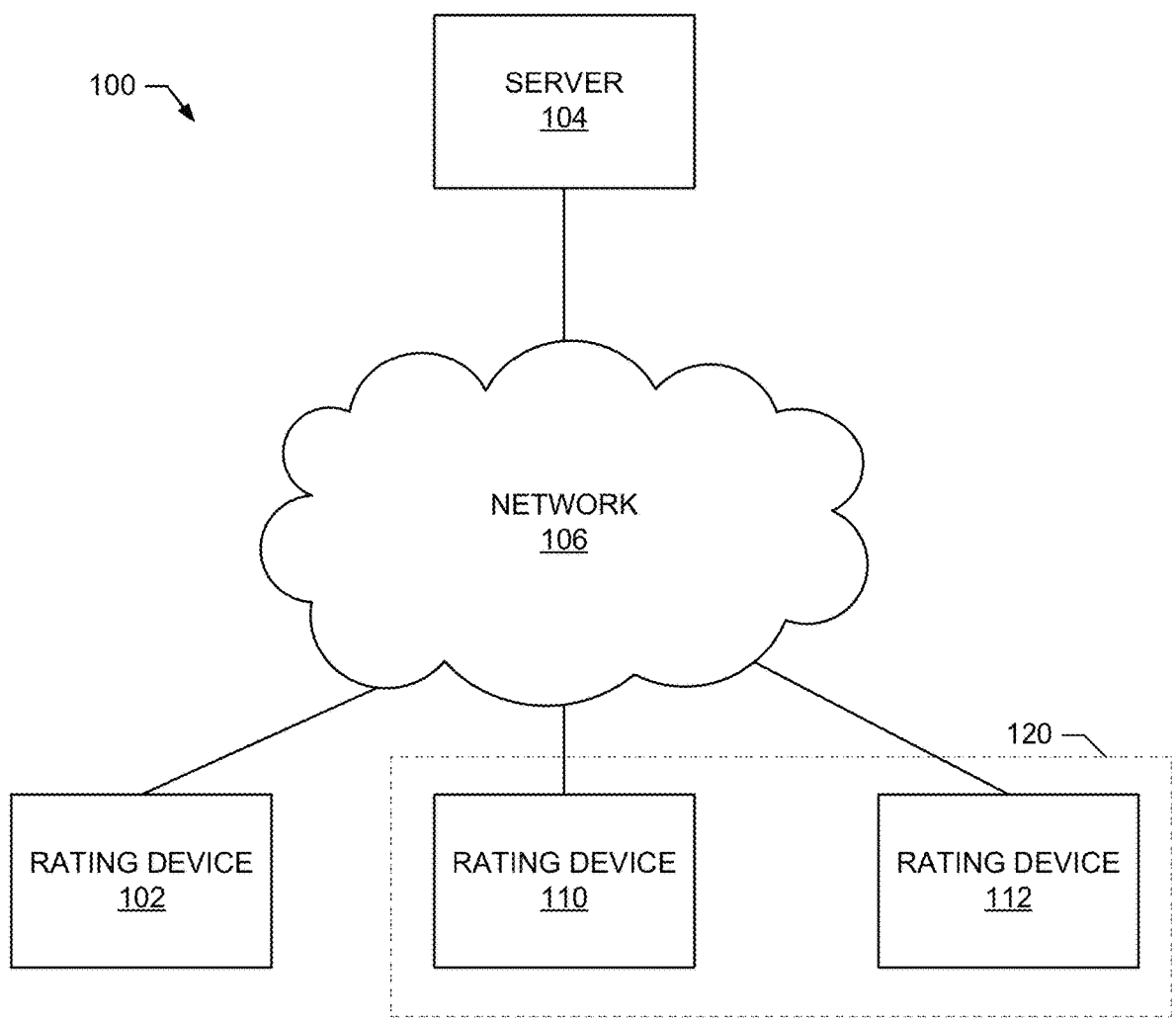
FIG. 1 is a block diagram of an example environment in which rating information is collected and analyzed.

Rating information for products and services may provide valuable information to providers of products and services as well as to users/consumers of such products and services. For example, in the context of a ride sharing service, a driver may choose not to pick up a passenger that has a low rating. The value of rating information for products and services is tied closely to the trustworthiness, accuracy, and fairness of the rating information. Unfortunately, rating information provided by people may be affected by human prejudices, intentional and/or unintentional biases, misunderstandings, etc. For example, a driver may provide an unfairly low rating to a passenger based on a recognized or unrecognized bias against a characteristic of the passenger.

In this disclosure, reference is made to rating information collected and analyzed for a ride sharing service. Reference is made to analyzing ratings submitted by a driver of the ride sharing service about a passenger of the ride sharing service. It should be understood that the scope of this disclosure encompasses many other scenarios in which ratings are utilized. Any references to ratings by a driver of a passenger apply generally to any situation in a rater presents ratings of a product or service (e.g., a product or service for which a ratee is associated). For example, ratings by a passenger about a driver may be collected and analyzed. Ratings about other services involving drivers and passengers may be analyzed (e.g., taxi services, train services, bus services, air transport services, etc.). Ratings about a business, a customer of a business, etc. may be analyzed. Additionally, any type of environment in which a person rates a product or service and information beyond the rating score/value are available (e.g., information about a ratee associated with the product or service) may be analyzed as disclosed herein.

Methods and apparatus disclosed herein facilitate the collection and analysis of rating information. In some examples disclosed herein, collected rating information is analyzed to detect and flag instances of bias, unfairness, inaccuracy, etc. For example, ratings that are flagged may be discarded, reviewed, discussed with the rater, discussed with the person being rated, etc.

In some examples disclosed herein, a provided rating is compared against information collected about the product or service provided. For example, in the context of ride sharing, the rating is compared against information collected during a ride, information collected about the driver, and/or information collected about the passenger. In some examples disclosed herein, audio and/or video is collected within a vehicle during a ride. The audio and/or video may be analyzed to determine sentiment(s) expressed during the ride (e.g., using speech-to-text conversion), ages of vehicle occupants, genders of vehicle occupants, races of vehicle occupants, identities of vehicle occupants (e.g., using facial recognition, voice analysis, image recognition, image analysis, etc.), etc. In some examples disclosed herein, additional information may be collected such as payment information, information about a tip, a payment method utilized, a duration of a trip, a route followed during the trip, temperature information, information about the vehicle (e.g., vehicle diagnostic information, vehicle operation characteristics, vehicle speed, etc.), etc. In some examples, information may also be collected and shared among rating devices In some examples disclosed herein, the collected information is stored and/or transmitted to a server for analysis. In some examples, the rating may be analyzed at a server located outside the vehicle. In other examples, the rating is analyzed at a rating device located at the site of the provided product or service (e.g., in a vehicle). In an example in which the analysis is performed in the vehicle, prior rating information may be retrieved from a server (e.g., prior information about ratings submitted by the rater, prior information about ratings of the person being rated, etc.).

In some examples disclosed herein, rating information for a rater is periodically analyzed. In other examples, an analysis is performed each time new rating information is received. Such analyses process received rating information and other collected information to determine if biases, inaccuracy, or unfairness may have influenced one or more ratings. For example, a statistical analysis may be performed to identify trends in the rating data (e.g., a trend that a particular passenger gender is consistently rated lower than passengers of another gender). In some examples, the statistical analysis may also analyze a larger pool of rating information (e.g., universe of all rating information) to determine if a trend is unique to a rater or is consistent with ratings from all raters. In some examples, the statistical analysis may utilize artificial intelligence, machine learning (e.g., supervised machine learning or unsupervised machine learning), cluster analysis, and/or any other analysis technique.

FIG. 1 is a block diagram of an example environment 100 in which rating information is collected by a rating device 102. The collected rating information is analyzed at the rating device 102 and/or a collection server 104 to detect instances and/or trends of bias, unfairness, inaccuracy, etc. in the rating information. The example environment 100 includes the example rating device 102, the example server 104, an example network 106, and example additional rating devices 110, 112.

The example rating device 102 is a computing device installed in a ride sharing vehicle. The example rating device 102 includes inputs to allow a driver to input a rating of a passenger. In addition, the example rating device 102 includes an interface through which a passenger may make a payment for the service. The example rating device 102 also includes sensors for collecting additional information (e.g., audio, video, images, temperature, vehicle movement, etc.) about the environment in the ride sharing vehicle. The example rating device 102 stores the collected information and periodically transmits the information to the server 104. In some examples, the rating device 102 additionally or alternatively processes the collected information to detect problems with the rating information (e.g., to identify biases, inaccuracies, unfairness, etc.).

According to the illustrated example, the rating device 102 is a computing device enclosed in a case that may be placed or mounted within a vehicle. Alternatively, the rating device 102 may be implemented by another type of computing device. For example, the rating device 102 may be implemented by software installed on a computing device used by a driver of a ride sharing vehicle for other purposes (e.g., may be implemented by software installed on a mobile phone, laptop computer, vehicle computer) or any combination of computing devices. For example, a ride sharing driver may download an app onto his mobile phone to facilitate participation in the ride sharing service and the app may include the functionality to collect and analyze rating information. In some such examples, sensors available in the computing device may be utilized to collect information (e.g., a microphone and camera of the mobile phone may be accessed by the app). In other examples, sensors may be attached to or other coupled to/within the computing device.

Figure 2:
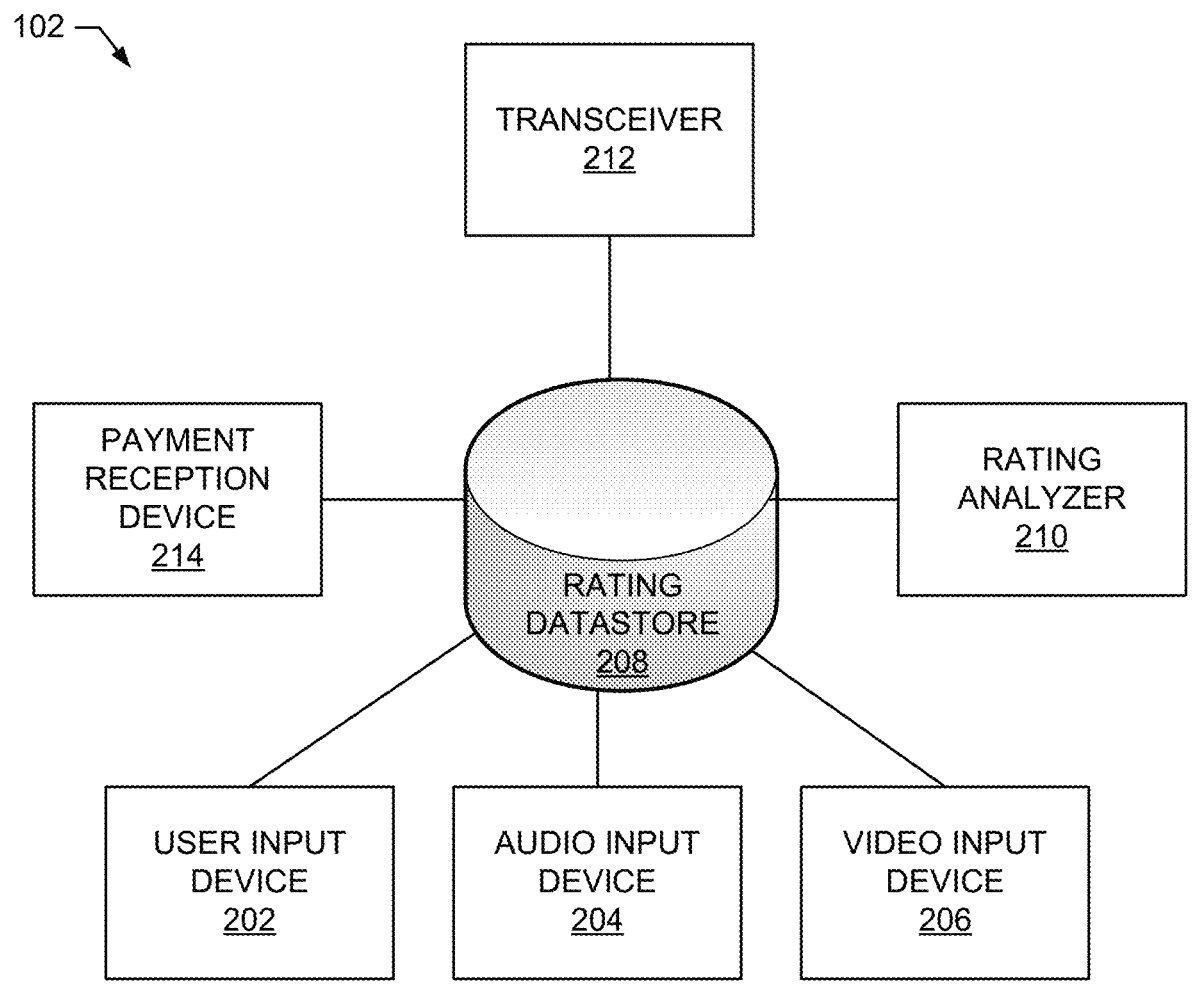
FIG. 2 is a block diagram of an example implementation of the rating device of FIG. 1.

The rating device is described in further detail in conjunction with FIG. 2.

The example server 104 is a computing device that is communicatively coupled to the rating device 102 via the example network 106. The server 104 of the illustrated example collects rating information and other information collected by the rating device 102. The example server 104 analyzes the rating information and other information to detect ratings and/or raters that are to be flagged as discrepancies. The example server 104 publishes the rating information for others to review (e.g., for other drivers to access to determine if they want to accept a ride sharing pickup request). Alternatively, the server 104 may receive analyzed information and may leave the analysis to the rating device 102. For example, the server 104 may simply stored information about ratings for access by others.

While the example environment 100 includes a single server 104, any number of servers may be utilized and the operations of the server 104 may divided among the multiple servers in any manner.

Figure 3:
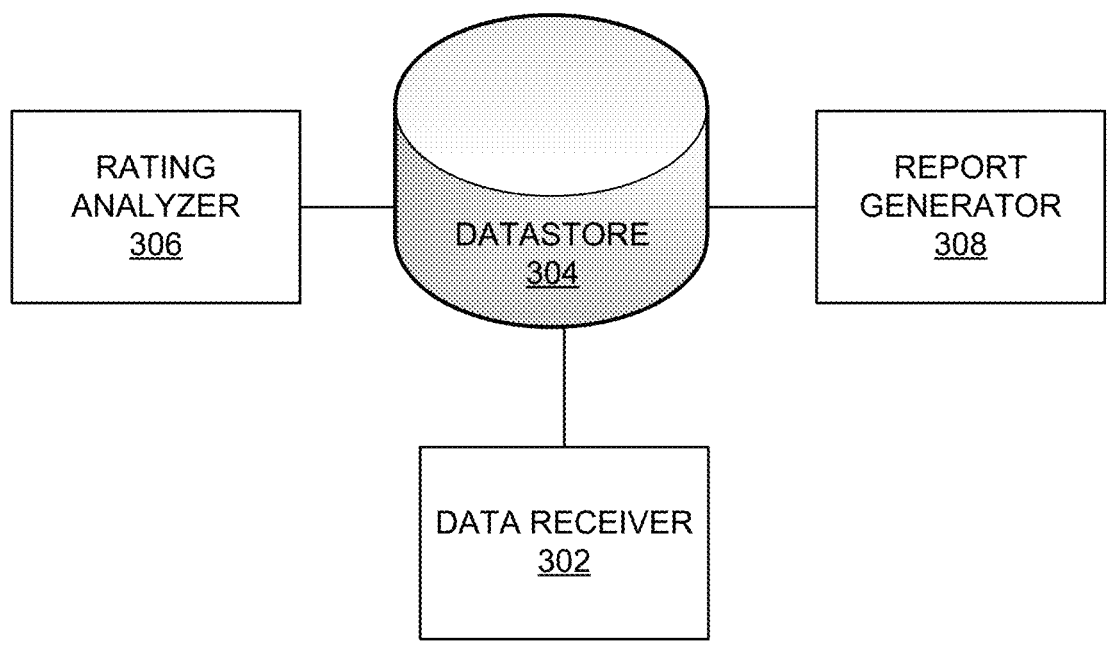
FIG. 3 is a block diagram of an example implementation of the collection server of FIG. 1.

The server 104 is described in further detail in conjunction with FIG. 3.

The example network 106 of the illustrated example is a wide area network (e.g., the Internet). Alternatively, the network 106 may be any type, combination, and number of networks and intermediate computing devices. For example, the network 106 may include any number of wide area networks, local area networks, wireless networks, wired networks, etc.

The example environment 100 includes additional rating devices (e.g., first rating device 110 and second rating device 112). According to the illustrated example, the first and second rating devices 110, 112 are installed in another vehicles 120 in a ride sharing network. For example, the first rating device 110 may be utilized by a driver to submit a rating for a passenger and the second rating device 112 may be utilized by a passenger to submit a rating for a driver. In some examples, information may be shared among the first and second rating devices 110, 112. For example, video and audio from the first rating device 110 may be shared with the second rating device 112 and/or otherwise associated with a rating provided by the second rating device 112. According to the illustrated example of FIG. 1, the server collects rating information and other information from the example rating device 102 and the additional rating devices 110, 112 and analyzes the collection of information to identify discrepancies in a subset of the data (e.g., rating information received from a particular rater), trends, etc.

In operation of the example environment 100 of FIG. 1, the rating device 102 and the additional rating devices 110, 112 collect rating information and other context information, store the information, and transmit the information to the example server 104 via the example network 106. The example server 104 logs the received information for ongoing analysis. The example server 104 analyzes the information to identify ratings biases, trends, or other discrepancies. In some examples, ratings that are identified as discrepancies may be discarded, removed from a user rating, flagged for further review, flagged for discussing the ratings with the rater, etc.

FIG. 2 is a block diagram of an example implementation of the rating device 102 of FIG. 1 (e.g., and similarly the additional rating devices 110, 112). The example rating device 102 includes an example user input device 202, an example audio input device 204, an example video input device 206, an example datastore 208, an example rating analyzer 210, an example data transceiver 212, and an example payment reception device 214.

The example user input device 202 is a collection of buttons that a rater uses to submit rating information (e.g., a first button to increase a rating score and a second button to decrease a rating score). Alternatively, the user input device 202 may be any type of user input device(s) and/or collection thereof (e.g., e.g., a touch sensitive input device, a dial, a switch, a keyboard, a voice input, etc.). Rating information received by the user input device 202 is stored in the example datastore 208.

The example audio input device 204 is a microphone to capture ambient audio within a ride sharing vehicle. According to the illustrated example, the microphone is installed within the rating device 102 and exposed to the outside of the rating device 102 to capture the ambient audio (e.g., mounted on an external part of the rating device 102, mounted near an access hole in a case of the rating device 102, etc.). Alternatively, the microphone may be an external microphone that is communicatively coupled to the audio input device 204 (e.g., a wired and/or wireless connection). The audio input device 204 may alternatively be any other type of device for receiving audio. For example, audio may be received via a network connection from another device that includes a microphone. While a single audio input device 204 is illustrated in FIG. 2, any number of audio input devices 204 may be employed. Audio collected by the example audio input device 204 is stored in the example datastore 208 in association with rating information received via the example rating analyzer 210.

The example video input device 206 is a camera to capture video within a ride sharing vehicle. According to the illustrated example, the camera is installed within the rating device 102 and exposed to the outside of the rating device 102 to capture the video (e.g., mounted on an external part of the rating device 102, mounted near an access hole in a case of the rating device 102, etc.). Alternatively, the camera may be an external camera that is communicatively coupled to the video input device 206 (e.g., a wired and/or wireless connection). The video input device 206 may alternatively be any other type of device for receiving video. For example, video may be received via a network connection from another device that includes a camera. While a single video input device 206 is illustrated in FIG. 2, any number of video input devices 206 may be employed. Video collected by the example video input device 206 is stored in the example datastore 208 in association with rating information received via the example rating analyzer 210.

The example rating datastore 208 is a data storage device in which rating information and other collected information (e.g., information received from the example user input device 202, audio received from the example audio input device 204, video received from the example video input device 206, etc.). According to the illustrated example, the rating datastore 208 is a database that stores a rating record for each rating event, wherein the rating event stores a rating input by a driver for a passenger, collected audio data, collected video data, and any other information collected about the driver, passenger, or environment during a ride to which the rating information corresponds. Alternatively, the rating datastore 208 may be implemented by any one or more type(s) of data storage and/or data structure such as flash memory, storage disk, file, etc.

The example rating device 102 includes the example rating analyzer 210 to process rating information and information collected in association with a rating to detect bias, inaccuracy, etc. According to the illustrated example, the rating analyzer 210 may optionally be enabled. For example, when the rating analyzer 210 is disabled, rating information and associated information is transmitted to the example server 104 instead of being analyzed at the rating device 102. In other examples, when the rating analyzer 210 is enabled, rating information and associated information is analyzed at the rating device 102 and the results are shared with the example server 104. Alternatively, the rating device 102 may not include the rating analyzer 210 when all rating analysis is performed at the example server 104.

The rating analyzer 210 of the illustrated example analyzes historical rating information and associated information stored in the example rating datastore 208 to detect bias, inaccuracy, etc. The rating analyzer 210 of the illustrated example processes the collected information to format it for analysis and then performs an analysis (e.g., a statistical analysis, an artificial intelligence-based analysis, a machine learning based analysis, etc.) to detect bias.

Processing the collected information to format it for analysis includes analyzing and formatting the collected information so that it is suitable for use in an analysis (e.g., converting data into parameters, values, etc. that can be analyzed). For example, the rating analyzer 210 analyzes audio received from the example audio input device 204 (and/or received from the example video input device 206) to determine a sentiment (e.g., positive, negative, confrontational, angry, etc.) expressed during a ride associated with rating information received via the example user input device 202. Such analysis may include speech-to-text processing, natural language processing, etc. The example rating analyzer 210 analyzes video received from the example video input device 206 to determine demographic information about the passenger and/or driver (e.g., age, gender, race, identity using facial recognition, etc.). For example, machine learning and image recognition may be utilized to determine demographic information for a person in the vehicle. For example, a machine learning model may be trained on demographic information (e.g., a model trained on different races of persons) and images from video may be analyzed to determine a race of a person present in the image. Similarly, a machine learning model may be trained on audio to determine demographic information from the audio.

According to the illustrated example, the rating analyzer 210 stores the results of analysis of collected information in the example rating datastore 208 for transmission to the server 104 for later processing. Alternatively, the analyzed information is stored in the rating datastore 208 for processing by the rating analyzer 210 at the rating device 102.

To process the rating information to detect bias, inaccuracy, etc., the example rating analyzer 210 utilizes data analytics to detect trends in the ratings by the driver. For example, the rating analyzer 210 retrieves current and past ratings by the driver and analyzes them to detect correlations based on bias. For example, the rating analyzer 210 may process the data to detect a trend. For example, an analysis may indicate that a driver consistently rates a particular race at a level lower than other races. The rating analyzer 210 may use any type of data analytics (e.g., machine learning, artificial intelligence, statistical analysis, etc.). To detect bias, the rating analyzer 210 may compare a result of the analysis to a threshold, may determine a similarity of the analysis result to a model, etc. A result of the analysis is stored in the example rating datastore 208 for transmission by the example transceiver 212.

The example transceiver 212 transmits ratings, collected information, and/or results of analyses to the server 104. For example, the rating information and collected information may be transmitted to the server 104 for analysis. Alternatively, the results of analysis may be transmitted to the server 104 for handling. In some examples, handling includes distributing rating information to other users of the system (e.g., other drivers, other passengers, etc.). In some examples, handling includes preventing distribution of rating information determined to be based on a trend of bias. In some examples, handling includes selecting a driver identified as submitting ratings based on bias for review, training, etc.

The example rating device 102 also includes the payment reception device 214 to receive a payment from a passenger. According to the illustrated example, the payment reception received is a credit card payment processing device. Additionally or alternatively, the payment reception device 214 may be any type of device for processing payments (e.g., a contactless payment receiver, a networked payment receiver, a currency payment receiver, etc.). In some examples, the payment receipt information is stored in the example rating datastore 208 for use in analyzing rating information. For example, payment information (including tip information) may be a factor indicative of the quality of the ride.

While an example manner of implementing the rating device 102 of FIG. 1 is illustrated in FIG. 2, one or more of the elements, processes and/or devices illustrated in FIG. 2 may be combined, divided, re-arranged, omitted, eliminated and/or implemented in any other way. Further, the example user input device 202, the example audio input device 204, the example video input device 206, the example rating datastore 208, the example rating analyzer 210, the example transceiver 212, the example payment reception device 214 and/or, more generally, the example rating device 102 of FIG. 1 may be implemented by hardware, software, firmware and/or any combination of hardware, software and/or firmware. Thus, for example, any of the example user input device 202, the example audio input device 204, the example video input device 206, the example rating datastore 208, the example rating analyzer 210, the example transceiver 212, the example payment reception device 214 and/or, more generally, the example rating device 102 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user input device 202, the example audio input device 204, the example video input device 206, the example rating datastore 208, the example rating analyzer 210, the example transceiver 212, the example payment reception device 214 and/or, more generally, the example rating device 102 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example rating device 102 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 3 is a block diagram of an example implementation of the server 104 of FIG. 1. The example server 104 includes an example data receiver 302, an example datastore 304, an example rating analyzer 306, and an example report generator 308.

The example data receiver 302 is a network interface to communicatively couple the server 104 with the example rating device 102 and the example other rating devices 110, 112 via the example network 106. Alternatively, the example data receiver 302 may be any other type of interface to receive rating and collection information. Data received via the example data receiver 302 is stored in the example datastore 304.

The example datastore 304 is a data storage device in which rating information and other collected information (e.g., information received from the example rating device 102 by the example data receiver 302). According to the illustrated example, the datastore 304 is a database that stores a rating record for each rating event, wherein the rating event stores a rating input by a driver for a passenger, collected audio data, collected video data, and any other information collected about the driver, passenger, or environment during a ride to which the rating information corresponds. Alternatively, the datastore 304 may be implemented by any one or more type(s) of data storage and/or data structure such as flash memory, storage disk, file, etc.

The example rating analyzer 306 processes rating information and associated information as described in conjunction with the example rating analyzer 210 of FIG. 2. The example rating analyzer 306 stores the results of the analysis in the example datastore 304.

The example report generator 308 generates reports based on the analysis generated by the rating analyzer 306. Additionally or alternatively, the report generator 308 generates reports based on the analysis generated by the example rating analyzer 210. For example, the report generator 308 may generate a report identifying a driver or drivers that submitted ratings that have been identified as potentially based on bias. For example, While an example manner of implementing the server 104 of FIG. 1 is illustrated in FIG. 3, one or more of the elements, processes and/or devices illustrated in FIG. 3 may be combined, divided, re-arranged, omitted, eliminated and/or implemented in any other way. Further, the example data receiver 302, the example datastore 304, the example rating analyzer 306, the example report generator 308 and/or, more generally, the example server 104 of FIG. 1 may be implemented by hardware, software, firmware and/or any combination of hardware, software and/or firmware. Thus, for example, any of the example data receiver 302, the example datastore 304, the example rating analyzer 306, the example report generator 308 and/or, more generally, the example server 104 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data receiver 302, the example datastore 304, the example rating analyzer 306, the example report generator 308 and/or, more generally, the example server 104 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example server 104 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
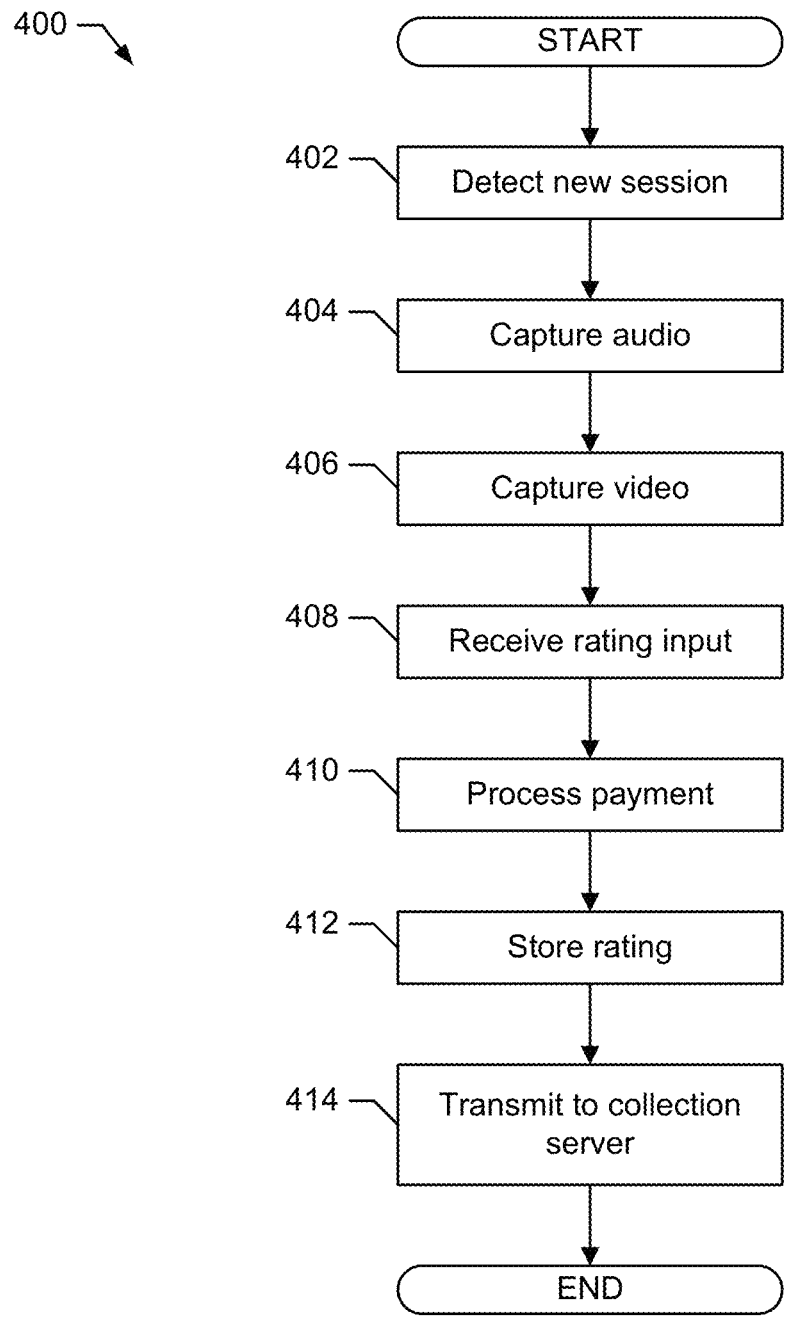
FIG. 4 and FIG. 6 are flowcharts representative of machine readable instructions which may be executed to implement the rating device of FIG. 1 and/or FIG. 2.
Figure 6:
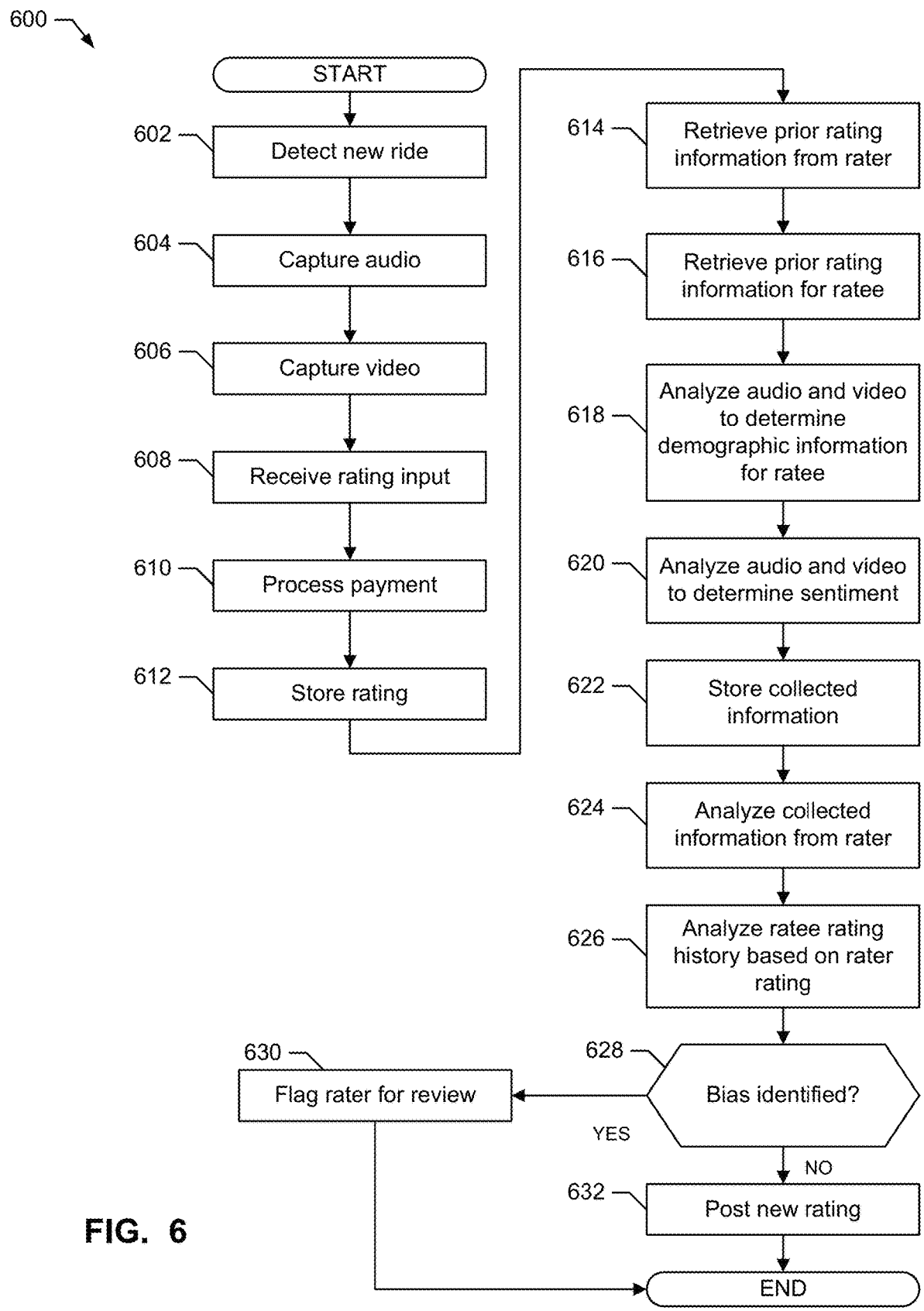

Flowcharts representative of example hardware logic, machine readable instructions, hardware implemented state machines, and/or any combination thereof for implementing the rating device 102 of FIG. 1 and/or FIG. 2 are shown in FIG. 4 and FIG. 6. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIG. 4 and FIG. 6, many other methods of implementing the example rating device 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4 and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The program 400 of FIG. 4 begins when the rating analyzer 210 detects a new session (block 402). A session may be any event or set of events for which a rating is related. For example, a session may be a ride sharing ride from pickup to drop off, a transaction from start to end, a provision of a service from start to end, etc. In describing FIGS. 4-6, reference is made to a ride sharing session in which a driver rates a passenger by way of example. The scope of this disclosure encompasses any situation in which a rater rates a ratee or a product or service provided by the ratee. A new session may be detected based on user input and/or information determined about a context (e.g., information from another device). For example, a driver may input information that a new ride has started using the user input device 202. Alternatively, the rating analyzer 210 may receive another indication of a new ride (e.g., a network communication from a ride sharing system, a detection of a new passenger based on audio from the audio input device and/or video from the video input device, etc.).

During the ride, the example user audio input device 204 captures audio (block 404) and the example video input device 206 captures video (block 406). For example, the audio input device 204 and the video input device 206 may stream captured audio/video to the example rating datastore 208. Additionally or alternatively, the audio input device 204, the video input device 206, and/or the example rating analyzer 210 may process the audio/video as it is captured to extract information (e.g., to convert speech to text, to identify a person based on audio and/or video, to detect a sentiment expressed, etc.).

The example user input device 202 receives a user input of a rating (block 408). For example, according to the illustrated example, the rating is received near the end of the ride (e.g., just prior to payment by the passenger). Alternatively, the rating may be input at any other time such as after the passenger has paid and exited the vehicle, during the ride (e.g., the driver may continually adjust the rating throughout the ride, may input a rating when something happens during the ride, etc.), or any other time.

The example payment reception device 214 then processes a payment for the ride (block 410). Alternatively, processing for the payment may occur at any other time (e.g., prior to the ride beginning, after a passenger has exited the vehicle, during the ride, etc.).

The example rating datastore 208 then stores a record with the rating and collected information (block 412). For example, a record may be created to store a rating value, collected audio information, collected video information, collected payment information, etc. Alternatively, the collected information may be stored in any manner (e.g., multiple records for each ride, separate tables for separate types of collected information that are linked together, etc.).

According to the illustrated example, the transceiver 212 then transmits the collected rating record to the server 104 (block 414). Thus, according to the example program of FIG. 4, the full analysis of the rating information is performed at the server 104. According to the illustrated example, after transmitting the rating information to the server 104, the process of FIG. 4 ends. An example implementation in which analysis of the rating information is also performed at the rating device 102 is described in conjunction with FIG. 6.

Figure 5:
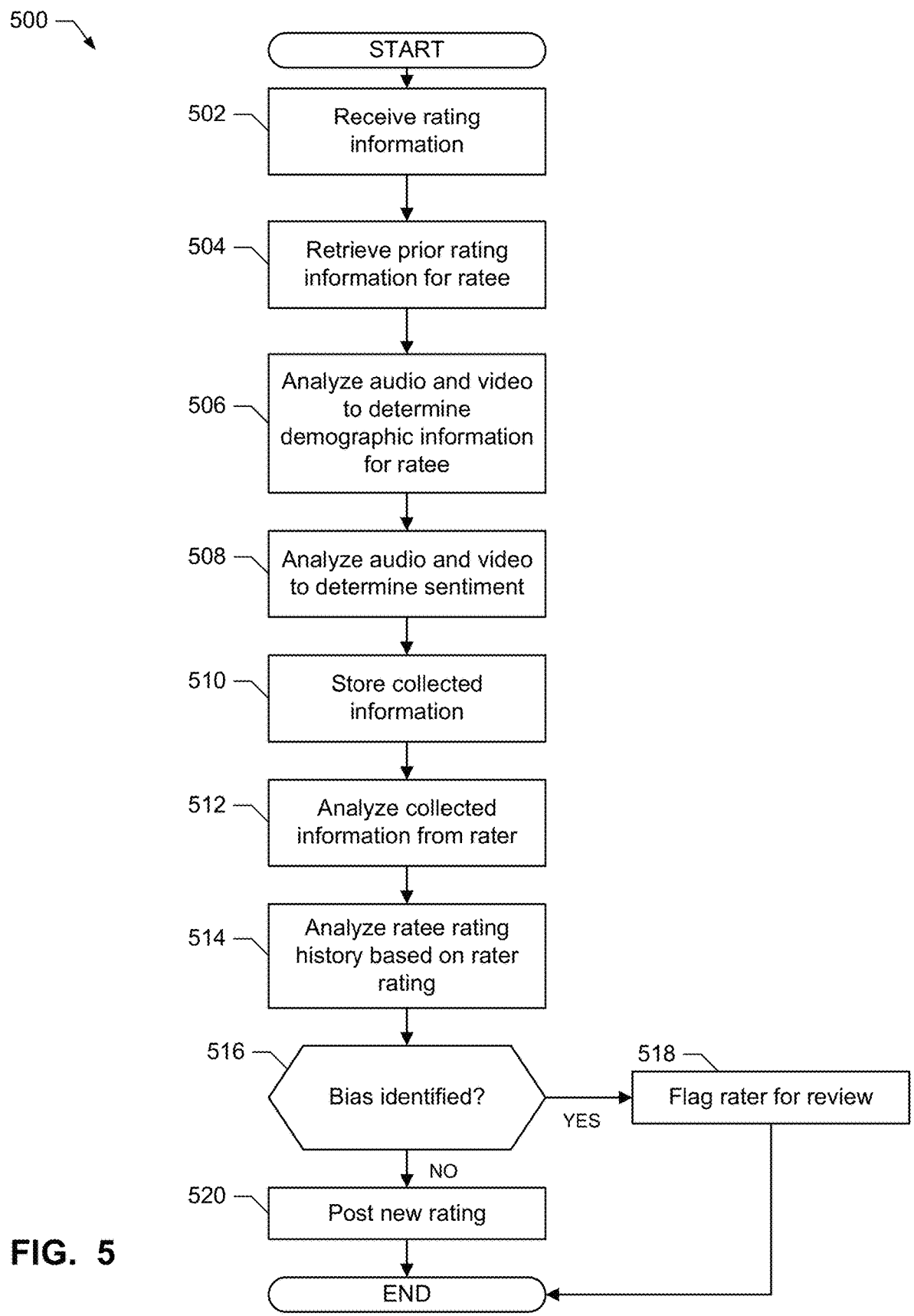
FIG. 5 is a flowchart representative of machine readable instructions which may be executed to implement the collection server of FIG. 1 and/or FIG. 3.

A flowchart representative of example hardware logic, machine readable instructions, hardware implemented state machines, and/or any combination thereof for implementing the server 104 of FIG. 1 and/or FIG. 3 is shown in FIG. 5. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 5, many other methods of implementing the example server 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The program 500 of FIG. 5 implements the example server 104 to analyze rating information received from the example rating device 102 (and other rating devices such as rating devices 110, 112).

The example program 500 begins when the example data receiver 302 receives new rating information from the rating device 102 (block 502).

The example rating analyzer 306 retrieves, from the example datastore 304, prior rating information for a passenger identified in the received rating information (block 504). For example, the rating analyzer 306 may retrieve information about ratings from other raters and/or information about the passenger (e.g., previously identified demographic information determined from audio and/or video collected during rides or information submitted by the passenger (e.g., submitted when registering to use the service)).

The example rating analyzer 306 analyzes audio and/or video included in the rating information to determine demographic information for the passenger (block 506). For example, previously generated machine learning models could be applied to the audio and/or video to detect an age of the passenger, a gender of the passenger, a nationality of the passenger, a socioeconomic class of the passenger, etc. Alternatively, any other analytics, machine learning, artificial intelligence, human classifier, etc. approach may be utilized to determine demographic information.

The example rating analyzer 306 then analyzes the audio and/or video to determine a sentiment expressed during the ride (block 508). For example, the rating analyzer 306 may use any available analytics approach (e.g., speech-to-text analysis combined with machine learning analysis) to determine an overall sentiment, a sentiment expressed by the driver, and a sentiment expressed by the passenger (e.g., positive, negative, happy, sad, angry, confrontational, appreciative, etc.). For example, a cluster analysis may be performed to cluster sentiment of text determined from speech that was detected in the vehicle during the ride corresponding to the rating information.

The example datastore 304 stores the results of the analysis of the audio and video (block 510). For example, any information from the resulting analysis may be stored. According to the illustrated example, the analysis produces values, parameters, metrics, etc. that may be used in an analysis of the historical ratings for a passenger and/or submitted by a driver.

The example rating analyzer 306 then analyzes the collected information from the rater (e.g., the driver) (block 512). For example, the rating analyzer 306 may conduct an analysis of all ratings submitted by the rater to detect bias based on demographic information. For example, a machine learning analysis may be used to analyze the rating information by the driver across multiple demographic groups to detect if a particular demographic group is consistently rated more highly than other demographic groups, given lower ratings than other demographic groups, etc. In some examples, the analysis may only determine if the demographic groups belonging to the passenger associated with the rating information received in block 502 are associated with a trend or bias in the driver's rating information. Alternatively, the analysis may determine if there is any trend of bias indicating in any demographic group found in the entirety of the rating information for the driver.

The example rating analyzer 306 additionally analyzes the passenger rating history based on the driver rating (block 514). For example, the rating analyzer 306 may determine if the rating assigned to the passenger deviates from the passenger's prior ratings beyond a threshold. Such a deviation may provide an additional indication that the rating assigned to the passenger by the driver is unfair.

The example rating analyzer 306 then determines if the analysis in block 512 and/or block 514 indicates a bias in the rating information (block 516). For example, the rating analyzer 306 may determine that bias or unfairness is present in the rating if the demographic group of the passenger is associated with a trend identified in the prior rating information from the driver and if the rating deviates from prior ratings of the passenger by other drivers by a threshold amount. In another example, the rating information may be flagged as biases if the analysis of the historical ratings by the driver indicates a bias in any demographic group (regardless of whether the demographic group is associated with the passenger associated with the received rating information).

According to the illustrated example, when the rating analyzer 306 determines that bias is present (block 516), the report generator 308 flags the driver and/or the rating information for review (block 518). For example, a notice may be sent to the driver and the company managing the driver indicating that the driver's ratings have been flagged for review. A person from the managing company may review the ratings information. The driver may be submitted for training, discipline, etc. In such an example, the rating information for the passenger may be prevented from being published to avoid unfairly impacting the rating of the passenger (e.g., decreasing an overall rating for the passenger, increasing an overall rating for the passenger, etc.).

When bias is not identified in the rating information (block 516), the report generator 308 posts the rating information for the passenger to the rating history for the passenger (block 520). For example, a rating score submitted in the rating information may be added to the history to affect an overall, average, etc. rating for the passenger.

After flagging the driver for review (block 518) or posting the rating (block 520), the process 500 of FIG. 5 ends until the next rating information is received.

FIG. 6 illustrates a process 600 that may be executed to implement the rating device 102 to receive and analyze rating information (instead of sending the rating information to the server 104 for analysis). The rating device 102 may perform all analysis of rating information. In other examples the rating device 102 may perform analysis when the server 104 is not available (e.g., a network connection is not available).

According to the illustrated example, blocks 602 to 612 to collect and store rating information correspond to blocks 402 to 412 of FIG. 4, respectively, and are not further described herein.

The example rating analyzer 210 of FIG. 2 then retrieves prior ratings submitted by the driver from the server 104 via transceiver 212 (block 614). Alternatively, prior rating information from the driver may be stored in the rating datastore 208 and, thus, may be available without retrieval from the server 104. For example, the rating device 102 may be uniquely assigned to a driver and, thus, all ratings from the driver may be stored in the rating datastore 208 as they are received from the driver.

The example rating analyzer 210 then retrieves prior rating information for the passenger from the server 104 (block 616). Alternatively, when the server 104 is unavailable and/or prior ratings for the passenger will not be analyzed, the prior rating information for the passenger would not be retrieved.

The rating information is analyzed in blocks 618 to 632. Blocks 618 to 632 correspond blocks 506 to 520, respectively, except that blocks 618, 620, 624, 626, 628, 630, and 632 are performed by the rating analyzer 210 and block 622 is performed by the rating datastore 208.

Figure 7:
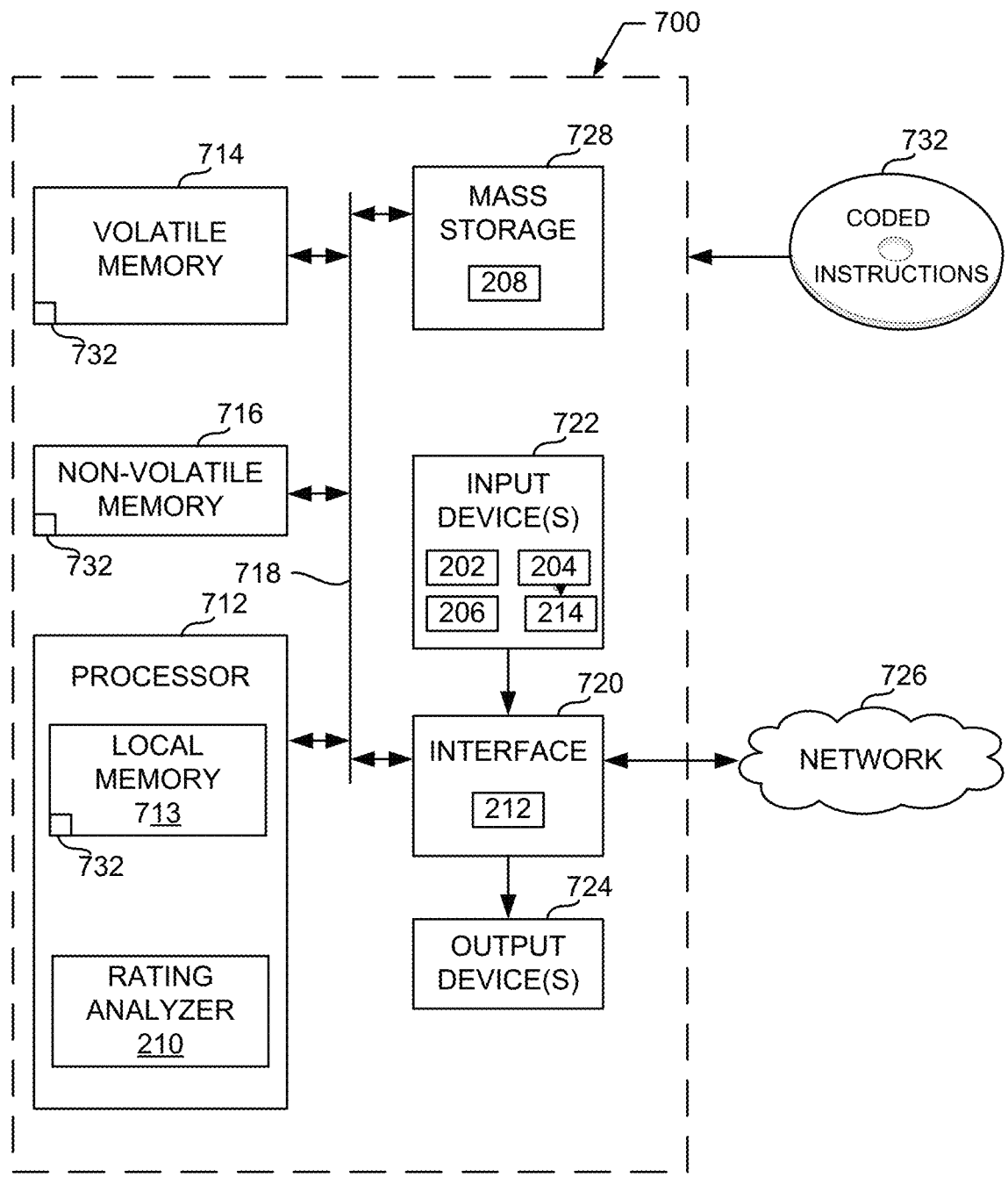
FIG. 7 is a block diagram of an example processing platform structured to execute the instructions of FIG. 4 and/or FIG. 6 to implement the rating device of FIG. 1 and/or FIG. 2.

FIG. 7 is a block diagram of an example processor platform 700 structured to execute the instructions of FIGS. 4 and 6 to implement the rating device 102 of FIG. 1 and/or FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the rating analyzer 210.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface. In this example, the interface circuit 720 implements the transceiver 212.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system. In this example, the one or more input devices 722 implement the user input device 202, the audio input device 204, and the video input device 206.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In this example, the mass storage 728 implements the rating datastore 208.

The machine executable instructions 732 of FIGS. 4 and 6 may be stored in the mass storage device 728, in the volatile memory 714, in the non-volatile memory 716, and/or on a removable non-transitory computer readable storage medium such as a CD or DVD.

Figure 8:
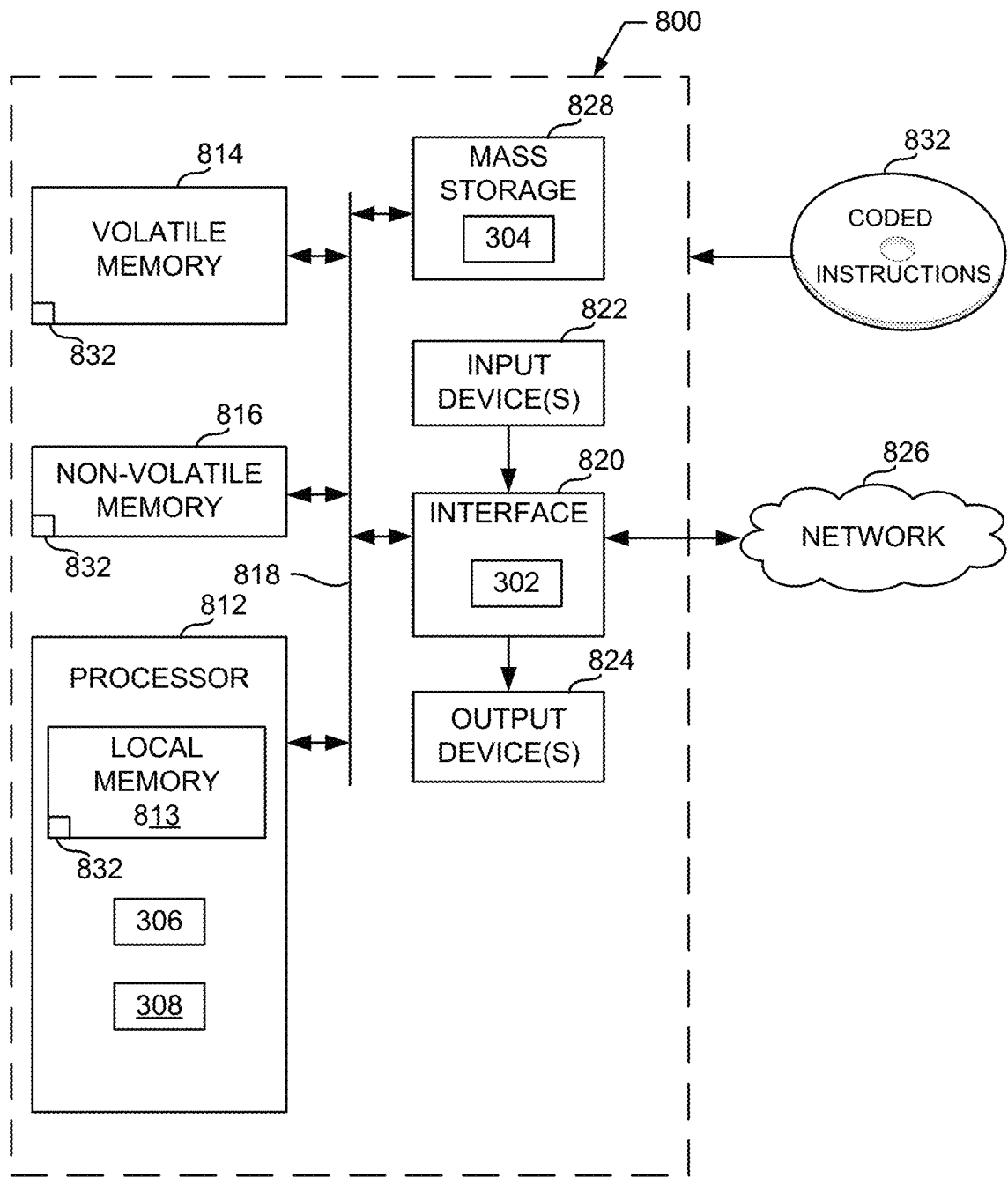
FIG. 8 is a block diagram of an example processing platform structured to execute the instructions of FIG. 5 to implement the crating server of FIG. 1 and/or FIG. 3.

FIG. 8 is a block diagram of an example processor platform 800 structured to execute the instructions of FIG. 5 to implement the server 104 of FIG. 1 and/or FIG. 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the rating analyzer 306 and the report generator 308.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC)

interface, and/or a PCI express interface. In this example, the interface circuit 820 implements the data receiver 302.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system. In this example, One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. In this example, the mass storage 828 implements the datastore 304.

The machine executable instructions 832 of FIGS. 4 and 6 may be stored in the mass storage device 828, in the volatile memory 814, in the non-volatile memory 816, and/or on a removable non-transitory computer readable storage medium such as a CD or DVD.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

From the foregoing, it will be appreciated that example methods, apparatus and articles of manufacture have been disclosed that implement a rating device to collect additional information about ratings to help ensure fair, unbiased, accurate reviews submitted by a person in a system. By extracting relevant information from audio and/or video captured within an environment (e.g., a ride sharing vehicle), the example rating device facilitates such an analysis without requiring the users to input relevant information (e.g., demographic information can be determined passively without requiring input or knowledge of the users). The disclosed methods, apparatus and articles of manufacture are accordingly directed to one or more improvement(s) in the functioning of a computer.

Various examples including the following are disclosed herein.

Example 1 includes a system to collect rating information, the system comprising at least one of an audio input device or a video input device to collect at least one of audio or video, a rating input device to receive a rating associated with a person, a first rating analyzer to analyze the at least one of the audio or the video to determine demographic information for the person, and a second rating analyzer to analyze the demographic information, the rating, and historical rating information to detect a demographic trend in the rating information, and output an indication of the trend.

Example 2 includes a system as defined in example 1, wherein the first rating analyzer and the second rating analyzer are the same.

Example 3 includes a system as defined in example 1, wherein the first rating analyzer is in a rating device and the second rating analyzer is in a server communicatively coupled to the rating device via a network.

Example 4 includes an apparatus as defined in one of examples 1-3, wherein the apparatus includes the audio input device and the video input device.

Example 5 includes an apparatus as defined in one of examples 1-3, further including a payment reception device to receive a payment.

Example 6 includes an apparatus as defined in one of examples 1-3, wherein the second rating analyzer is to retrieve the historical rating information for the person via a network.

Example 7 includes an apparatus as defined in one of examples 1-3, wherein the second rating analyzer is to post the rating associated with the person when a demographic trend is not identified.

Example 8 includes an apparatus as defined in one of examples 1-3, wherein the second rating analyzer is to prevent the rating associated with the person from being posted in response to detecting the demographic trend.

Example 9 includes an apparatus as defined in one of examples 1-3, wherein the first rating analyzer is to analyze the audio by performing speech-to-text analysis of the audio.

Example 10 includes an apparatus to collect rating information, the apparatus comprising at least one of an audio input device or a video input device to collect at least one of audio or video, a rating input device to receive a rating associated with a person, a rating analyzer to analyze the at least one of the audio or the video to determine demographic information for the person, analyze the demographic information, the rating, and historical rating information to detect a demographic trend in the rating information, and output an indication of the trend.

Example 11 includes an apparatus as defined in example 10, wherein the apparatus includes the audio input device and the video input device.

Example 12 includes an apparatus as defined in example 10, further including a payment reception device to receive a payment.

Example 13 includes an apparatus as defined in one of examples 10-12, wherein the rating analyzer is to retrieve the historical rating information for the person via a network.

Example 14 includes an apparatus as defined in one of examples 10-12, wherein the rating analyzer is to post the rating associated with the person when a demographic trend is not identified.

Example 15 includes an apparatus as defined in one of examples 10-12, wherein the rating analyzer is to prevent the rating associated with the person from being posted in response to detecting the demographic trend.

Example 16 includes an apparatus as defined in one of examples 10-12, wherein the rating analyzer is to analyze the audio by performing speech-to-text analysis of the audio.

Example 17 includes a method to collect rating information, the method comprising collecting at least one of audio or video, receiving a rating associated with a person, analyzing the at least one of the audio or the video to determine demographic information for the person, analyzing the demographic information, the rating, and historical rating information to detect a demographic trend in the rating information, and outputting an indication of the trend.

Example 18 includes a method as defined in example 17, further comprising collecting the at least one of the audio or video from at least one of an audio input device and a video input device.

Example 19 includes a method as defined in example 17, further comprising receiving payment information from a payment reception device.

Example 20 includes a method as defined in one of examples 17-19, further comprising retrieving the historical rating information for the person via a network.

Example 21 includes a method as defined in one of examples 17-19, further comprising posting the rating associated with the person when a demographic trend is not identified.

Example 22 includes a method as defined in one of examples 17-19, further comprising preventing the rating associated with the person from being posted in response to detecting the demographic trend.

Example 23 includes a method as defined in one of examples 17-19, wherein analyzing the audio includes performing speech-to-text analysis of the audio.

Example 24 includes a non-transitory computer readable medium comprising instructions that, when executed, cause a machine to at least collect at least one of audio or video, receive a rating associated with a person, analyze the at least one of the audio or the video to determine demographic information for the person, analyze the demographic information, the rating, and historical rating information to detect a demographic trend in the rating information, and output an indication of the trend.

Example 25 includes a non-transitory computer readable medium as defined in example 24, wherein the instructions, when executed, cause the machine to collect the at least one of the audio or video from at least one of an audio input device and a video input device.

Example 26 includes a non-transitory computer readable medium as defined in example 24, wherein the instructions, when executed, cause the machine to receive payment information from a payment reception device.

Example 27 includes a non-transitory computer readable medium as defined in one of examples 24-26, wherein the instructions, when executed, cause the machine to retrieve the historical rating information for the person via a network.

Example 28 includes a non-transitory computer readable medium as defined in one of examples 24-26, wherein the instructions, when executed, cause the machine to post the rating associated with the person when a demographic trend is not identified.

Example 29 includes a non-transitory computer readable medium as defined in one of examples 24-26, wherein the instructions, when executed, cause the machine to prevent the rating associated with the person from being posted in response to detecting the demographic trend.

Example 30 includes a non-transitory computer readable medium as defined in one of examples 24-26, wherein the instructions, when executed, cause the machine to analyze the audio including performing speech-to-text analysis of the audio.

Example 31 includes an apparatus comprising means for collecting at least one of audio or video, means for receiving a rating associated with a person, means for analyzing the at least one of the audio or the video to determine demographic information for the person, means for analyzing the demographic information, the rating, and historical rating information to detect a demographic trend in the rating information, and means for outputting an indication of the trend.

Example 32 includes an apparatus as defined in example 31, further including payment means for receiving a payment.

Example 33 includes an apparatus as defined in example 31, further including means for retrieving the historical rating information for the person via a network.

Example 34 includes an apparatus as defined in one of examples 31-33, further including means for posting the rating associated with the person when a demographic trend is not identified.

Example 35 includes an apparatus as defined in one of examples 31-33, further including means for preventing the rating associated with the person from being posted in response to detecting the demographic trend.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. A system to collect rating information, the system comprising:
at least one of an audio input device or a video input device to collect at least one of audio or video captured in a vehicle;

rating input device circuitry to receive at least two ratings associated with people, the people including a passenger and a driver of the vehicle, and ratings being submitted by the passenger and the driver via the rating input device;
first rating analyzer circuitry to employ a machine learning technique to analyze the at least one of the audio or the video to (i) use images from video to determine demographic information for the people and (ii) use a cluster analysis technique to determine one or more sentiments of the people expressed in the at least one of the audio or the video;
second rating analyzer circuitry to employ a machine learning technique to: analyze the rating submitted by a first person in the vehicle, the analysis based on the demographic information for a second person in the vehicle, the one or more sentiments of the people, and historical ratings submitted by the first person, wherein the rating submitted by the first person is a rating of the second person; and
determine whether the rating submitted by the first person includes a bias, the determination based on the analysis and whether the rating submitted by the first person deviates from prior ratings of the second person by a threshold amount; and
report generator circuitry to:
post the rating submitted by the first person to the historical ratings, the post in response to a determination that the rating submitted by the first person does not include a bias; and
discard the rating submitted by the first person in response to a determination that the rating submitted by the first person includes a bias.

2. A system as defined in claim 1, wherein the first rating analyzer circuitry and the second rating analyzer circuitry are a same rating analyzer circuitry.

3. A system as defined in claim 1, wherein the first rating analyzer circuitry is in a rating device and the second rating analyzer circuitry is in a server communicatively coupled to the rating device via a network.

4. A system as defined in claim 1, wherein the system includes the audio input device and the video input device.

5. A system as defined in claim 1, further including a payment reception device to receive a payment.

6. A system as defined in claim 1, wherein the second rating analyzer circuitry is to retrieve the historical ratings submitted by the first person via a network.

7. A system as defined in claim 1, wherein to discard the rating submitted by the first person, the report generator circuitry is to flag the rating submitted by the first person for review.

8. A system as defined in claim 1, wherein the first rating analyzer circuitry is to analyze the audio by performing speech-to-text analysis of the audio.

9. An apparatus to collect rating information, the apparatus comprising:
at least one of an audio input device or a video input device to collect at least one of audio or video captured in a vehicle;
rating input device circuitry to receive at least two ratings associated with people, the people being a passenger and a driver of the vehicle, and the ratings being submitted by the passenger and the driver via the rating input device;
rating analyzer circuitry to:
employ machine learning techniques to analyze the at least one of the audio or the video to (i) use images from video to determine demographic information for the people and (ii) use a cluster analysis technique to determine one or more sentiments of the people expressed in the at least one of the audio or the video;
employ machine learning techniques to: analyze the rating submitted by a first person in the vehicle, the analysis based on the demographic information for a second person in the vehicle, the one or more sentiments of the people, and historical ratings submitted by the first person, wherein the rating submitted by the first person is a rating of the second person; and
determine whether the rating submitted by the first person includes a bias, the determination based on the analysis and whether the rating submitted by the first person deviates from prior ratings of the second person by a threshold amount; and
report generator circuitry to:
post the rating submitted by the first person to the historical ratings, the post in response to a determination that the rating submitted by the first person does not include a bias; and
discard the rating submitted by the first person in response to a determination that the rating submitted by the first person includes a bias.

10. An apparatus as defined in claim 9, wherein the apparatus includes the audio input device and the video input device.

11. An apparatus as defined in claim 9, further including a payment reception device to receive a payment.

12. An apparatus as defined in claim 9, wherein the rating analyzer circuitry is to retrieve the historical ratings submitted by the first person via a network.

13. An apparatus as defined in claim 9, wherein to discard the rating submitted by the first person, the report generator circuitry is to flag the rating submitted by the first person for review.

14. An apparatus as defined in claim 9, wherein the rating analyzer circuitry is to analyze the audio by performing speech-to-text analysis of the audio.

15. A method to collect rating information, the method comprising:
collecting at least one of audio or video captured in a vehicle;
receiving at least two ratings associated with people, the people being a passenger and a driver of the vehicle, and the ratings being submitted by the passenger and the driver;
employing machine learning techniques to analyze the at least one of the audio or the video to (i) use images from video to determine demographic information for the people and (ii) use a cluster analysis technique to determine one or more sentiments of the people expressed in the at least one of the audio or the video;
employing machine learning techniques to: analyze the rating submitted by a first person in the vehicle, the analysis based on the demographic information for a second person in the vehicle, the one or more sentiments of the people, and historical ratings submitted by the first person, wherein the rating submitted by the first person is a rating of the second person; and
determining whether the rating submitted by the first person includes a bias, the determination based on the analysis and whether the rating submitted by the first person deviates from prior ratings of the second person by a threshold amount;

posting the rating submitted by the first person to the historical ratings, the post in response to a determination that the rating submitted by the first person does not include a bias; and discarding the rating submitted by the first person in response to a determination that the rating submitted by the first person includes a bias.

16. A method as defined in claim 15, further including collecting the at least one of the audio or video from at least one of an audio input device and a video input device.

17. A method as defined in claim 15, further including receiving payment information from a payment reception device.

18. A method as defined in claim 15, further including retrieving the historical ratings submitted by the person via a network.

19. A method as defined in claim 15, further including flagging the rating submitted by the first person for review.

20. A method as defined in claim 15, wherein analyzing the audio includes performing speech-to-text analysis of the audio.

21. A non-transitory computer readable medium comprising instructions that, when executed, cause a machine to at least:

collect at least one of audio or video captured in a vehicle;

receive at least two ratings associated with people, the people being a passenger and a driver of the vehicle, and the ratings being submitted by the passenger and the driver;

employ machine learning techniques to analyze the at least one of the audio or the video to (i) use images from video to determine demographic information for the people and (ii) use a cluster analysis technique to determine one or more sentiments of the people expressed in the at least one of the audio or the video;

employ machine learning techniques to: analyze the rating submitted by a first person in the vehicle, the analysis based on the demographic information for a second person in the vehicle, the one or more sentiments of the people, and historical ratings submitted by the first person, wherein the rating submitted by the first person is a rating of the second person; and determine whether the rating submitted by the first person includes a bias, the determination based on the analysis and whether the rating submitted by the first person deviates from prior ratings of the second person by a threshold amount;

post the rating submitted by the first person to the historical ratings, the post in response to a determination that the rating submitted by the first person does not include a bias; and discard the rating submitted by the first person in response to a determination that the rating submitted by the first person includes a bias.

22. A non-transitory computer readable medium as defined in claim 21, wherein the instructions, when executed, cause the machine to collect the at least one of the audio or video from at least one of an audio input device and a video input device.

* * * * *